United States Patent [19]
Imano et al.

[11] Patent Number: 4,793,000
[45] Date of Patent: Dec. 20, 1988

[54] LIGHT SIGNAL RECEIVER

[75] Inventors: Haruo Imano, Yokohama; Izumi Ichikawa; Satoshi Ogiwara, both of Atsugi; Genmei Miura, Tokyo, all of Japan

[73] Assignee: Canon Kabushiki Kaisha, Tokyo, Japan

[21] Appl. No.: 920,130

[22] Filed: Oct. 17, 1986

[30] Foreign Application Priority Data

Oct. 22, 1985 [JP] Japan .................. 60-234555
Oct. 22, 1985 [JP] Japan .................. 60-234556

[51] Int. Cl.$^4$ ............................... H04B 9/00
[52] U.S. Cl. ...................... 455/619; 329/117
[58] Field of Search .......... 250/214 A, 214 R, 206; 307/311; 331/66; 328/2; 455/619, 617; 329/117–118, 144

[56] References Cited

U.S. PATENT DOCUMENTS 4,156,135  5/1979  Miller, Jr. et al. .......... 455/619
4,258,719  3/1981  Lewyn ...................... 328/2
4,260,951  4/1981  Lewyn ...................... 328/2

Primary Examiner—Edward P. Westin
Assistant Examiner—Khaled Shami
Attorney, Agent, or Firm—Fitzpatrick, Cella, Harper & Scinto

[57] ABSTRACT

A light signal receiver comprises a photo-sensing element for sensing a modulated light signal, conversion means for converting the light signal sensed by the photosensing element to an electrical signal, and resonance means having a filter element or resonator connected in parallel with a load resistor of the photo-sensing element.

7 Claims, 5 Drawing Sheets

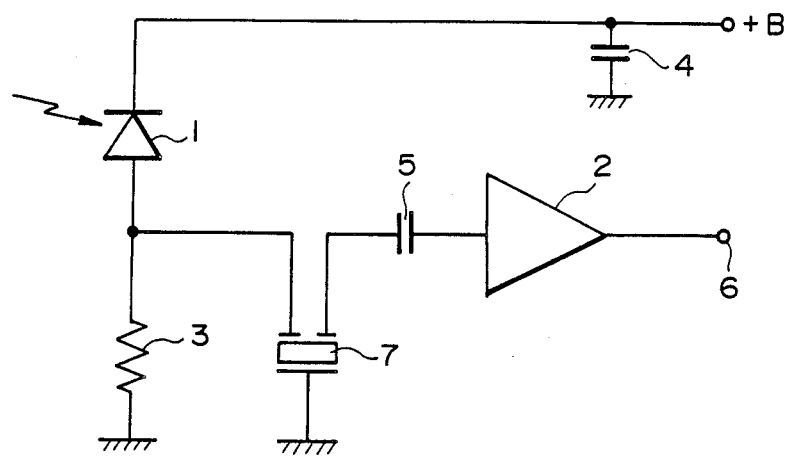
F I G. 1
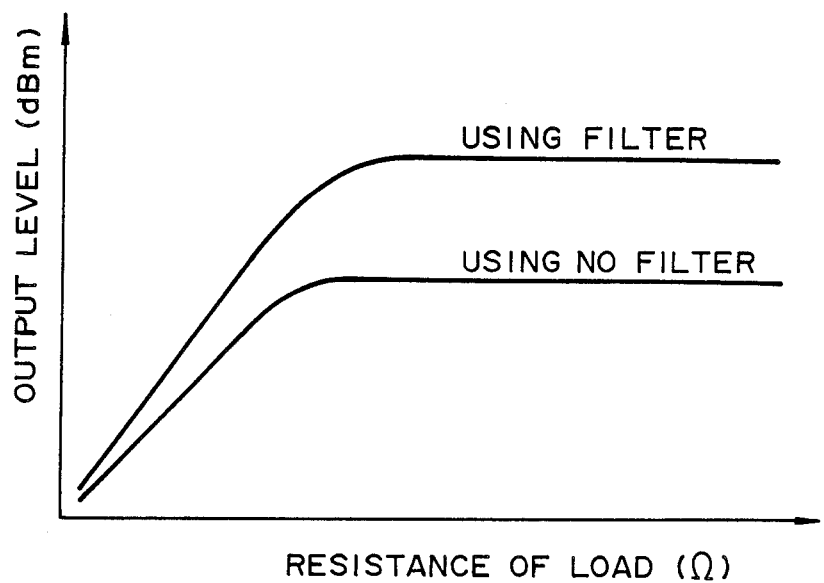
F I G. 2

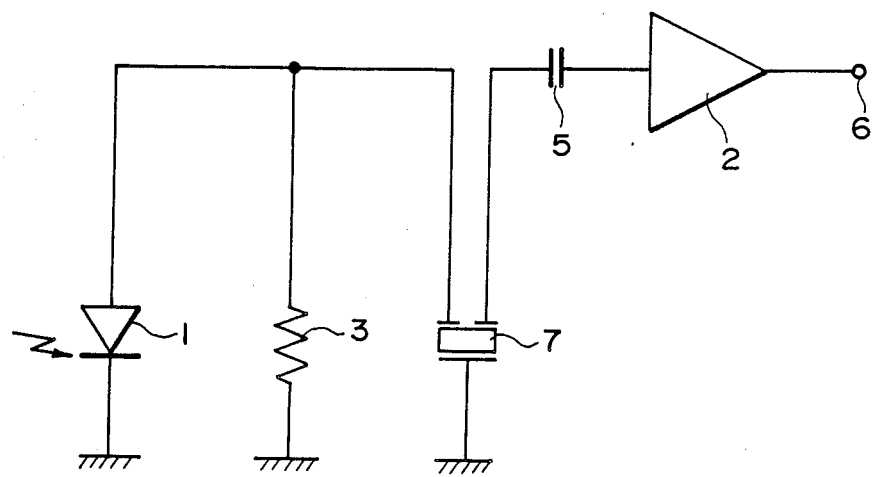
F I G. 5

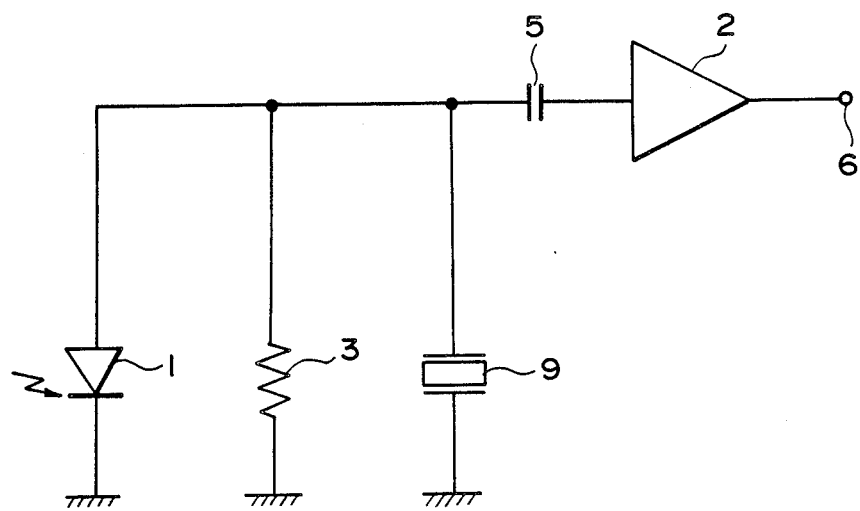
F I G. 8

LIGHT SIGNAL RECEIVER

BACKGROUND OF THE INVENTION

1. Field of the Invention

The present invention relates to a light signal receiver for converting a modulated light signal to an electrical signal.

2. Related Background Art

A light signal receiver has been widely used as an apparatus for detecting a change in a moving article or a material which exists on an optical path, and recently, it has been used as a light communication apparatus for transmitting various information by optical means by using a space or optical fiber as a transmission medium. A photo-sensitive element such as a photodiode or avalanche photo-diode has been used as a photoelectric conversion element for converting the light signal to the electrical signal.

FIG. 3 shows a specific circuit of a prior art light signal receiver.

In FIG. 3, numeral 1 denotes a photo-diode. A backward voltage +B is applied to a cathode of the photo-diode 1, and a load resistor 3 of the photo-diode 1 is connected to an anode. The junction between the photodiode 1 and the load resistor 3 is connected to an input terminal of an amplifier 2 through a coupling capacitor 5. Numeral 6 denotes an output terminal of the amplifier 2 and numeral 4 denotes a bypass capacitor for the backward voltage +B. In this light signal receiver, a light signal applied to the photo-diode 1 is photo-electrically converted to a signal current which flows through the load resistor 3 to develop a voltage across the load resistor 3. The developed voltage is applied to the amplifier 2 through the coupling capacitor 5, where it is amplified and a signal output is produced at the output terminal 6. The input impedance of the amplifier 2 is sufficiently larger than the load resistor 3.

When the light signal is to be detected in such a circuit, it is necessary to increase the load resistor 3 in order to improve receiving sensitivity. However, it has been experimentarily proved that the sensitivity saturates as the load resistor 3 increases, as shown in FIG. 4.

Further, because of a junction capacitance $C_j$ (shown by broken lines in FIG. 3) of the photo-diode 1, the signal output level decreases as the signal frequency increases, and this leads to reduction of the sensitivity of the light signal receiver.

SUMMARY OF THE INVENTION

It is an object of the present invention to provide an improved light signal receiver.

It is another object of the present invention to eliminate defects of the prior art apparatus.

It is still another object of the present invention to improve receiving sensitivity for a light signal.

It is still another object of the present invention to provide a light signal receiver whose receiving sensitivity does not decrease with the signal frequency of a light signal.

It is still another object of the present invention to match a light modulation signal frequency to a resonance frequency of a resonance circuit to produce a high power signal output having an excellent frequency selection characteristic.

It is still another object of the present invention to provide a resonance circuit having a filter element connected in parallel with a load resistor of a photodiode which serves as a photo-sensing element for a light signal.

It is still another object of the present invention to provide resonance circuit having a resonator (oscillator) connected in parallel with a load resistor of a photo-diode which serves as a photo-sensing element for a light signal.

Other objects of the present invention will be apparent from consideration of the following description of the preferred embodiments.

BRIEF DESCRIPTION OF THE DRAWINGS

FIG. 1 shows a circuit diagram of a first embodiment,

FIG. 2 shows a sensitivity enhancement characteristic in the first embodiment,

FIG. 5 shows a circuit diagram of a second embodiment, FIG. 8 shows a circuit diagram of a fourth embodiment.

DETAILED DESCRIPTION OF THE PREFERRED EMBODIMENTS

Figure 3:
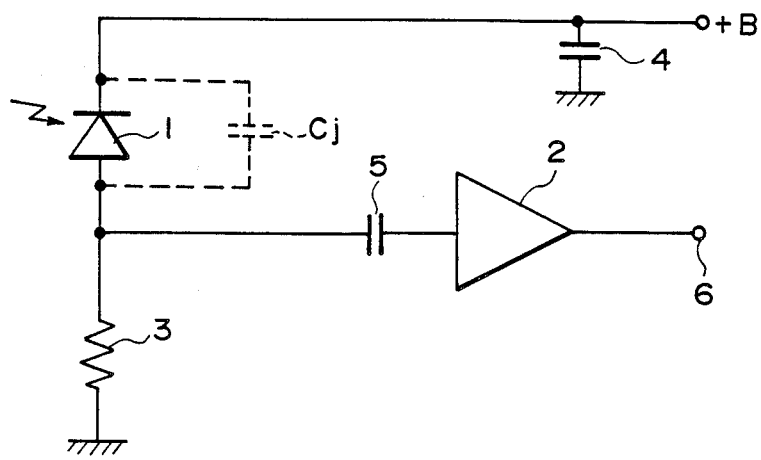
FIG. 3 shows a prior art circuit.
Figure 4:
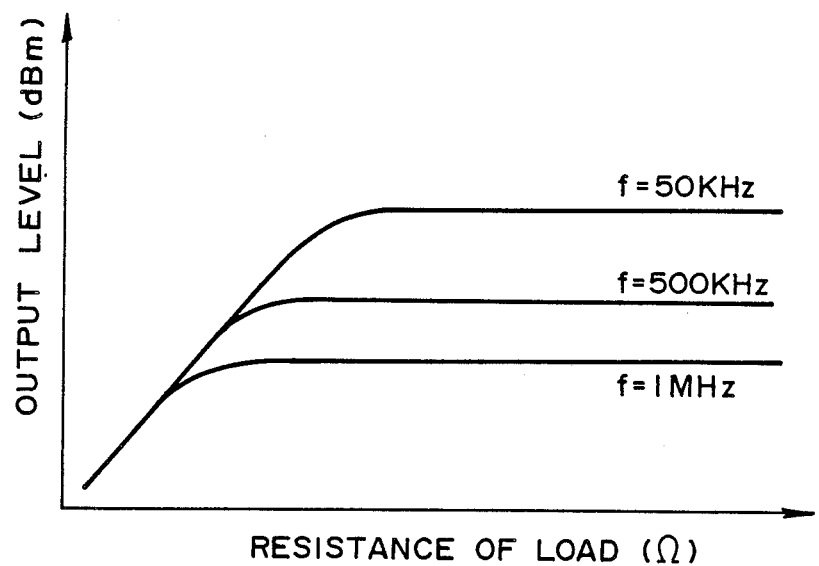
FIG. 4 shows an output level characteristic for each frequency in the prior art circuit.

Preferred embodiments of the present invention will now be explained with reference to the drawings.

In a first embodiment of the present invention, a resonance circuit is constructed by parallelly connecting a filter element with a load resistor of a photo-diode which serves as a photo-sensing element.

FIG. 1 shows a circuit diagram of the first embodiment. Numeral 1 denotes a photo-diode. A backward voltage +B is applied to a cathode of the photo-diode 1, and a load resistor 3 of the photo-diode 1 and a crystal resonator 7 are connected to an anode. The crystal resonator 7 serves as a filter element in this embodiment. The junction of the photo-diode 1 the, load resistor 3 and the crystal resonator 7 is connected to an input terminal of an amplifier 2 through a coupling capacitor 5. Numeral 6 denotes an output terminal of the amplifier 2 and numeral 4 denotes a bypass capacitor for the backward voltage +B. The input impedance of the amplifier 2 is sufficiently higher than the load resistor 3.

The present circuit is characterized by the parallel connection of the ceramic filter element 7 with the load resistor 3. In the present circuit, an equivalent circuit viewed from the input terminal of the amplifier 2 toward the photo-diode 1 forms a resonance circuit. When the modulation frequency of a light signal matches the resonant frequency of the resonance circuit, the resonance impedance of the resonance circuit is very high. Accordingly, an input level to the amplifier 2 is higher than an input level obtained when ceramic filter element 7 is not connected. As a result, the level at the output terminal 6 of the amplifier is also high, and the sensitivity of the light signal receiver is improved.

FIG. 2 shows experimental values of the receiving sensitivity of the first embodiment shown in FIG. 1.

In the first embodiment, the receiving sensitivity is improved at any frequency by properly selecting the resonance frequency.

In the first embodiment, the photo-diode is used as the photo-sensing element. A similar improvement may be attained by using an avalanche photo-diode. The ceramic filter element is used as the filter element. A similar improvement may be attained by other filter element such as crystal filter or SAW filter.

FIG. 5 shows a second embodiment which is a modification of the first embodiment. As shown, a similar advantage to that of the first embodiment is attained in the second embodiment, and the first embodiment can be applied to all circuits which use photo-diodes or avalanche diodes as the photo-sensitive elements.

As the sensitivity is improved, the signal to noise ratio is improved accordingly, and the filter element which has a frequency selection characteristic can bring an excellent frequency characteristic to the high sensitivity light signal receiver. Since the sensitivity is improved, weak light can be detected, and a simple and inexpensive light signal receiver having a high sensitivity characteristic can b constructed by merely connecting the filter element to a conventional light signal receiver.

As explained above, the present embodiment can be applied to all circuits which use photo-diodes or avalanche photo-diodes as the photo-sensing elements in the light signal receiver.

Figure 6:
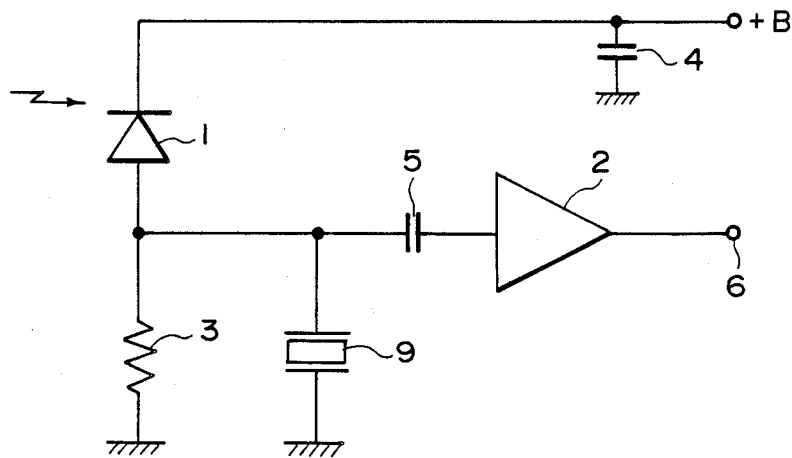
FIG. 6 shows a circuit diagram of a third embodiment.

A third embodiment in which a resonator is connected in parallel with a load resistor of a photo-diode which serves as the photo-sensing element is now explained. FIG. 6 shows a circuit diagram of the third embodiment. Numeral 1 denotes a photo-diode. A backward voltage +B is applied to a cathode of the photo-diode 1, and a load resistor 3 of the photo-diode 1 and a crystal resonator 9 are connected to the anode. A junction of the photodiode 1, load resistor 3 and crystal resonator 9 is connected to an input terminal of an amplifier 2 through a coupling capacitor 5. Numeral 6 denotes an output terminal of the amplifier 2 and numeral 4 denotes a bypass capacitor for the backward voltage +B. The input impedance of the amplifier 2 is sufficiently higher than the load resistor 3.

The characteristic of the above circuit is that the crystal resonator 9 is connected in parallel with the load resistor 3. In this circuit, an equivalent circuit as viewed from the input terminal of the amplifier 2 toward the photo-diode 1 forms a resonance circuit. When the modulation frequency of the light signal matches the resonant frequency of the resonance circuit, the resonance impedance of the resonance circuit is very high and an input level to the amplifier 2 is higher than that obtained when the crystal resonator 9 is not connected. Accordingly, the output level at the output terminal 6 of the amplifier increases. As a result, the sensitivity of the light signal receiver is improved. In FIG. 6, like numerals to those shown in FIG. 1 designate like elements.

Figure 7:
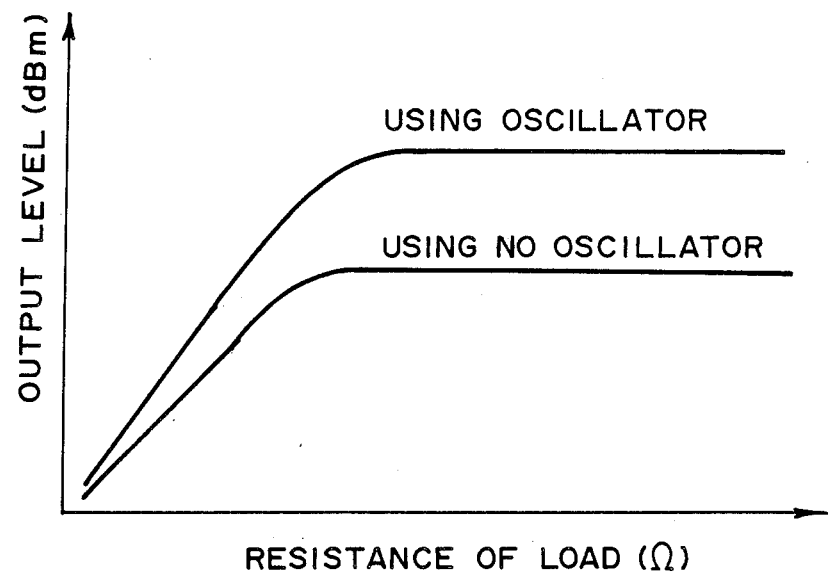
FIG. 7 shows an output level characteristic for each frequency in the prior art circuit.

FIG. 7 shows experimental data of the improved receiving sensitivity in the third embodiment shown in FIG. 6.

In the third embodiment, the receiving sensitivity is improved at any frequency by properly selecting the resonance frequency.

In the third embodiment, the photo-diode is used as the photo-sensing element. A similar improvement may be attained by using an avalanche photo-diode.

While the crystal resonator is used as the resonator, a similar advantage may be attained by using any other resonator (such as a ceramic resonator).

FIG. 8 shows a fourth embodiment which is a modification of the third embodiment. As shown, a similar advantage to that of the third embodiment is attained in the fourth embodiment.

As the sensitivity is improved, the signal to noise ratio is improved accordingly. Since the resonator has a high Q, the light signal receiver can have an excellent frequency selection characteristic. When the crystal resonator is used as the resonator, a very sharp frequency selection characteristic is attained. Since the sensitivity is improved, weak light can be detected. A simple and inexpensive light signal receiver having a high sensitivity characteristic can be constructed by merely connecting the resonator to the conventional light signal receiver.

The present embodiment can be applied to all circuits which use the photo-diodes or avalanche photodiodes as the photo-sensing elements of the light signal receiver.

In accordance with the present invention, a light signal receiver having a high sensitivity and an excellent frequency selection characteristic is provided.

We claim:

1. A light signal receiver for detecting information carried on a modulated light signal, said receiver comprising:
   light-sensitive receiving means for receiving the modulated light signal;
   converting means for converting the light signal received by said receiving means to an electrical signal; and
   resonance means connected to said receiving means and said converting means, for providing a resonant frequency in said receiver, said resonance means having a mechanical vibration element whose resonant frequency is tuned to a modulation frequency of the received signal, thereby to improve detection of the information carried on the modulated light signal.

2. A light signal receiver according to claim 1, wherein said receiving means is a photo-sensing element, and said resonance means is a resonance circuit having the mechanical vibration element connected in parallel with a load resistor of said photo-sensing element.

3. A light signal receiver according to claim 1, wherein said receiving means is a photo-sensing element, and said resonance means is a resonance circuit having a crystal resonator connected in parallel with a load resistor of said photo-sensing element.

4. A light signal receiver according to claim 1, wherein said receiving means is a photo-diode.

5. A light signal receiver comprising:
   a photo-sensing element for sensing a modulated light signal;
   conversion means for converting the light signal sensed by said photo-sensing element to an electrical signal; and
   resonance means having a filter element connected in parallel with a load resistor of said photo-sensing element.

6. A light signal receiver comprising:
   a photo-sensing element for sensing a modulated light signal;
   conversion means for converting the light signal sensed by said photo-sensing element to an electrical signal; and
   resonance means having a resonator connected in parallel with a load resistor of said photo-sensing element.

7. A light signal receiver according to claim 1, wherein said receiving means is a photo-sensing element, and said resonance means is a resonance circuit having a ceramic vibrating element connected in parallel with a load resistor of said photo-sensing element.

* * * * *